United States Patent
Kelly et al.

(10) Patent No.: US 8,312,264 B2
(45) Date of Patent: Nov. 13, 2012

(54) METHOD AND SYSTEM FOR AUTHENTICATION AMONG PEER APPLIANCES WITHIN A COMPUTER NETWORK

(75) Inventors: Thomas J. Kelly, Fergus (CA); Ronald Frederick, Mountain View (CA); Shrikrishna Karandikar, Fremont, CA (US); Wei Jen Yeh, San Jose, CA (US); Vineet Kumar, Sunnyvale, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1080 days.

(21) Appl. No.: 12/019,331

(22) Filed: Jan. 24, 2008

(65) Prior Publication Data
US 2008/0184030 A1 Jul. 31, 2008

Related U.S. Application Data

(63) Continuation-in-part of application No. 11/242,213, filed on Sep. 30, 2005, now Pat. No. 7,802,092.

(51) Int. Cl.
*H04L 29/06* (2006.01)

(52) U.S. Cl. ............... 713/156; 713/158; 726/4; 726/10

(58) Field of Classification Search .................. None
See application file for complete search history.

(56) References Cited

U.S. PATENT DOCUMENTS

| 6,751,729 | B1 * | 6/2004 | Giniger et al. | 713/153 |
|---|---|---|---|---|
| 6,826,690 | B1 * | 11/2004 | Hind et al. | 713/186 |
| 7,376,837 | B1 * | 5/2008 | Medvinsky | 713/175 |
| 2004/0064691 | A1 * | 4/2004 | Lu et al. | 713/158 |
| 2005/0120246 | A1 * | 6/2005 | Jang et al. | 713/201 |
| 2005/0160259 | A1 * | 7/2005 | Ogura et al. | 713/156 |

* cited by examiner

*Primary Examiner* — Minh Dinh
(74) *Attorney, Agent, or Firm* — Tarek N. Fahmi, APC

(57) ABSTRACT

A digital certificate associating a unique identifier for a computer-based appliance with an authentication key pair for that appliance is obtained from a certificate authority using a different, manufacturing key pair for the appliance. The manufacturing key pair may be generated by the appliance at or about its time of manufacture. The public key portion of the manufacturing key pair along with the unique identifier for the appliance may be provided via secure means to the certificate authority prior to the request for the digital certificate concerning the authentication key pair. Eventually, the digital certificate associated with the authentication key pair may be used by the appliance when joining a network, as part of a one-way or two-way authentication process.

17 Claims, 6 Drawing Sheets

__US 8,312,264 B2__

METHOD AND SYSTEM FOR AUTHENTICATION AMONG PEER APPLIANCES WITHIN A COMPUTER NETWORK

RELATED APPLICATIONS

This application is a Continuation-in-Part of U.S. patent application Ser. No. 11/242,213, filed 30 Sep. 2005 now U.S. Pat. No. 7,802,092, entitled "Method and System for Automatic Secure Delivery of Appliance Updates", which is assigned to the assignee of the present invention and incorporated by reference herein in its entirety.

FIELD OF THE INVENTION

The present invention relates to systems and methods for one-way and two-way authentication of computer-based appliances communicatively coupled to one another, for example via a network.

BACKGROUND

The use of computer systems and associated networks by which these systems are communicatively coupled to one another is ubiquitous. With the ever increasing use of such systems and networks, the need for security with respect to same has likewise increased. Thus, organizations that rely on complex computer systems and networks tend to employ sophisticated security systems to prevent unauthorized access to important data and processes stored on these systems.

While the use of such security measures can prevent the unauthorized disclosure of information, it can also complicate tasks associated with maintaining the networks and systems used by the organization. For example, when network administrators are required to reconfigure a network by adding one or more computer systems thereto, the task is complicated by the need to properly authenticate the new devices within the context of the other components of the network. Typically this requires the use of shared secrets (i.e., information elements known only to properly authenticated devices on a network) that must be securely communicated to each computer system, but such security instruments can be difficult to use properly and their compromise can lead to catastrophic security breaches. Moreover, the use of shared secrets can be burdensome inasmuch as every device on the network must be updated in the event of any compromise or simply periodically as part of a security audit or the like.

Thus there is a need for a system and method which allows for authentication and authorization of computer systems within a network but which is not based on the use of shared secrets.

SUMMARY OF THE INVENTION

In one embodiment of the present invention, at or about the time of manufacture of a computer-based appliance, the appliance generates a manufacturing key pair, which includes a manufacturing private key and a manufacturing public key. The manufacturing public key along with a unique identifier for the appliance (e.g., its serial number) are communicated to a certificate authority for later use. The manufacturing private key and unique identifier are also stored on the appliance.

At a later time, the appliance generates a second key pair—an authentication key pair made up of an authentication private key and an authentication public key. The appliance then contacts the certificate authority to request a signed digital certificate that associates its unique identifier with the authentication public key. This may be done using a certificate request that includes the appliance's unique identifier and authentication public key, which is digitally signed using the appliance's manufacturing private key.

Upon receipt of the certificate request, the certificate authority retrieves the manufacturing public key for the appliance, based on the unique identifier presented in the certificate request. Using this manufacturing public key, the certificate authority verifies the signature on the certificate request. If the signature is verified, the certificate authority issues a digital certificate associating the appliance's unique identifier with its authentication public key. In some cases, permissions for the appliance may also be coded in the signed digital certificate.

Subsequently, this digital certificate from the certificate authority may be used to authenticate the appliance when it seeks to join a network. For example, in one embodiment of the invention, when the appliance seeks to join a network it may send the certificate received from the certificate authority to a management node for the network it is seeking to join. The management node may validate this certificate using a locally installed certificate authority certificate. Provided that the appliance's certificate has not been revoked (e.g., as determined by consulting a list of revoked certificate or other means) and is otherwise valid, the management node may read the unique identifier from the appliance's certificate and compare it to a list of authorized devices for the network. If the appliance is authorized to join the network, the management node may advise other devices within the network of same and permit the appliance to join the network. Likewise, the appliance may be advised of other authorized devices within the network with which it may communicate and/or may be provided with software/firmware downloads/updates it is authorized to receive.

If permissions for the appliance were coded in the appliance's certificate, those permissions may be enforced/activated by the management node following authentication of the appliance. Alternatively, such permissions may be determined by consulting a permission table using the appliance's unique identifier as an index to that table.

In some instances, the authentication will be mutual. That is, while the management node is authenticating the appliance, the management node may present credentials to the appliance that allow the appliance to authenticate the management node in a fashion similar to that discussed above. Alternatively, this may be done after the management node is assured that the appliance is authorized to join the network.

Other features and embodiments of the present invention will be apparent from the accompanying drawings and from the detailed description which follows.

DESCRIPTION OF THE FIGURES

The present invention is illustrated by way of example, and not limitation, in the figures of the accompanying drawings, in which.

DETAILED DESCRIPTION

Described herein are systems and methods for authentication of computer-based appliances communicatively coupled to one another, for example via a network. Although these systems and methods will be discussed with reference to certain illustrated examples, these examples are not intended to limit the scope of the present invention. Instead, the scope of the invention should be measured only in terms of the claims following this description.

Various embodiments of the present invention may be implemented with the aid of computer-implemented processes or methods (a.k.a. programs or routines) that may be rendered in any computer language and executed by any form of computer system. For convenience, the term "appliance" will be used herein to refer to such computer systems. An appliance may be specially constructed for its intended purpose, or it may be a general-purpose computer system selectively programmed to perform such functions. In any event, its specific construction and/or function within a network is not critical to the present invention. Thus, the processes presented herein are not inherently related to any particular network, computer system or other apparatus.

Figure 1:
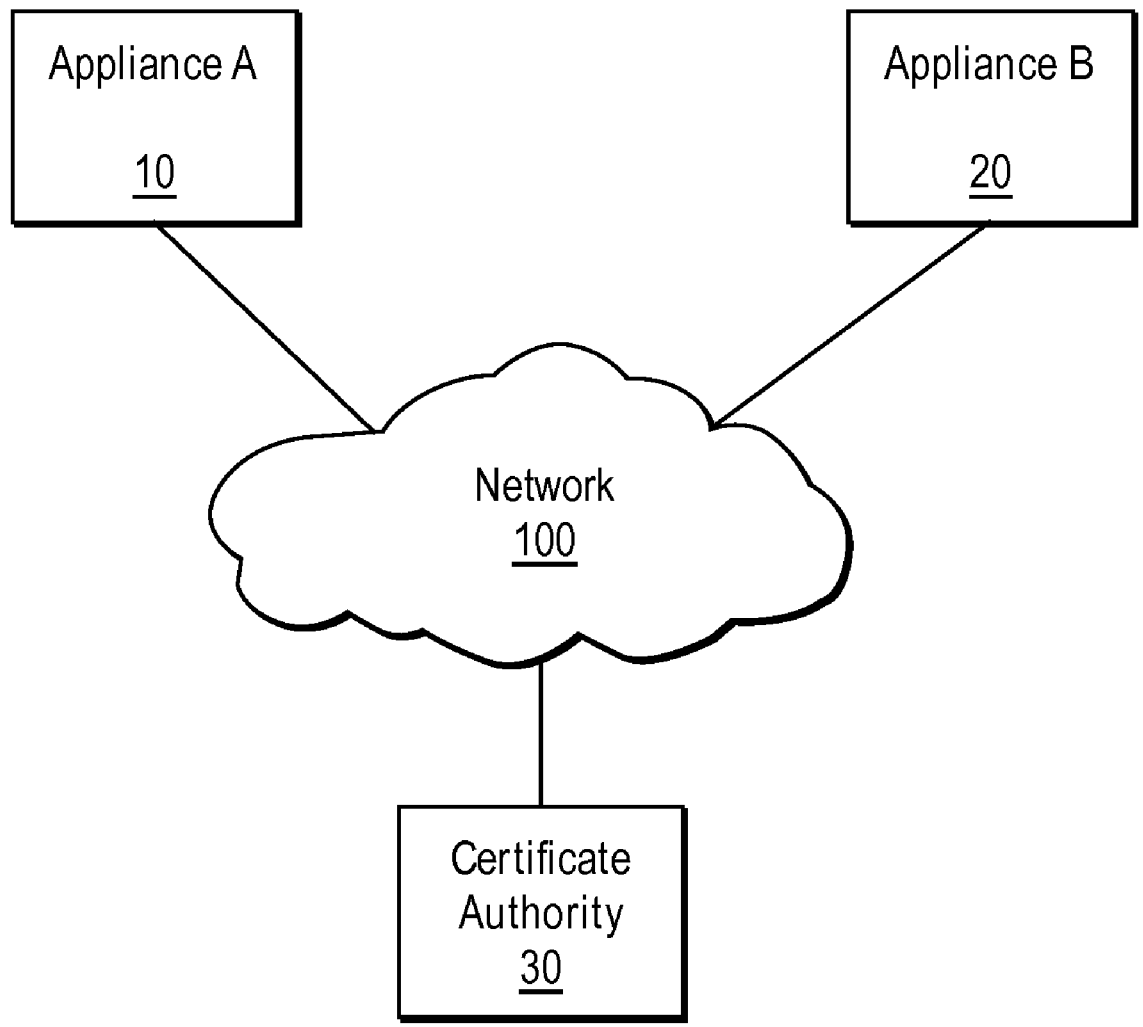
FIG. 1 depicts a network environment within which authentication techniques according to embodiments of the present invention may be utilized.

Referring now to FIG. 1, a network environment in which the present authentication procedures may be implemented is shown, In this example, two appliances, appliance A 10 and appliance B 20, and a certificate authority (CA) 30 are communicatively coupled to one another via a network 100. Just as the two appliances may be any form of computer environment, so too may CA 30 be any computer environment, for example, a personal computer or a server. Although this illustration shows a very simple arrangement of the two appliances and the CA, readers should appreciate that is merely for purposes of the present discussion and in practice the present invention is applicable within networks that include many more appliances and many more communication paths.

The present invention provides methods for one of these appliances to authenticate itself to the other appliance, and, if so desired, for the second appliance to also authenticate itself to the first appliance. Such authentication, be it one-way authentication or mutual authentication, is useful because it provides assurances that an appliance is communicating with an authorized peer within the network. The peer may be sender and/or recipient of information to/from the subject appliance.

For example, in some cases one of the appliances (a management node) may be tasked with administration of other appliances within the network and/or control over which appliances are authorized to communicate with other appliances of the network. In such instances, the management node may be used to authenticate appliances at the time such appliances seek to join the network and may maintain a list of such authorized appliances. As each appliance is so authenticated, the management node may add it to the list of authorized appliances and publish the list to other authorized appliances in the network. This way, appliances will be kept up to date as new authorized appliances are added to the network. Similarly, as appliances have their authorization revoked (e.g., because the appliances are being removed from the network or for other reasons), the management node may remove them from the list of authorized appliances and circulate changes to other nodes of the network so that those nodes will no longer communicate with the appliances lacking authorization.

In some cases, the list of authorized appliances may be provided to the management node by a network administrator. As new appliances seek access to a network, and are authenticated using the methods described below, the management node may add these devices to a "pending approval" list and notify the network administrator of the pending request. The network administrator may then approve or reject the pending request—however, because of the authentication processes provided by the present invention, the network administrator can be assured that the request is originating with an authenticated appliance. As devices are approved for access to the network the management node can update the authorized appliance list and publish same to the other nodes of the network, thus eliminating the need for an administrator to manually update those nodes. Thus, the present invention provides means for a management node to know that it is communicating with an authorized appliance (e.g., when issuing commands regarding the configuration and operation of that appliance), and likewise that the appliance is communicating with an authorized management node (e.g., so that the configuration and/or operation of the appliance cannot be hijacked by unauthorized devices).

In order to better appreciate the present authentication methods, some discussion of digital certificates and digital signatures is useful. Whereas handwritten signatures are associated with paper documents, increasingly today electronic signatures are used in the context of electronic documents (e.g., e-mail messages, contracts, etc.). Electronic signatures can be any symbol or process associated with a document that a person intends to adopt as his/her signature. Digital signatures are a special kind of electronic signature that employ cryptographic devices in order to assure a recipient of a document's (and here an e-mail message or other forms of electronic messages may be regarded as a form of document) integrity and authenticity.

In order to provide the assurance of authenticity, digital signatures make use of two separate but related cryptographic keys (called a key pair). One of these keys—called a public key—is made freely available to anyone, while the second key—the private key—is known only to the entity with which it is associated. An entity's public key is tied to that entity by a digital certificate issued by a certificate authority—a trusted issuer of such certificates—thus allowing the public key to be used as a means of identification.

For example, if a sender wants to send an authenticated message, he can sign the message using his private key and the recipient can then use the associated public key to verify the signature. The "signature" in this case is usually an encrypted form of a hash or digest of the original message; such encryption having been done using the sender's private key. At the receiving end, the recipient can compute a hash or digest of the received document and compare that computed hash with the one obtained by decrypting the signature using the public key of the entity that purportedly sent the document. If the two versions match, the signature is verified and the recipient can be certain that the message came from the sender associated with the public key. This scheme works because only the private key (which is known only to the sender) could have created the encrypted hash/digest that can be decrypted by its public key; hence, the document could not have been modified after the sender computed and encrypted the hash/digest.

Figure 2:
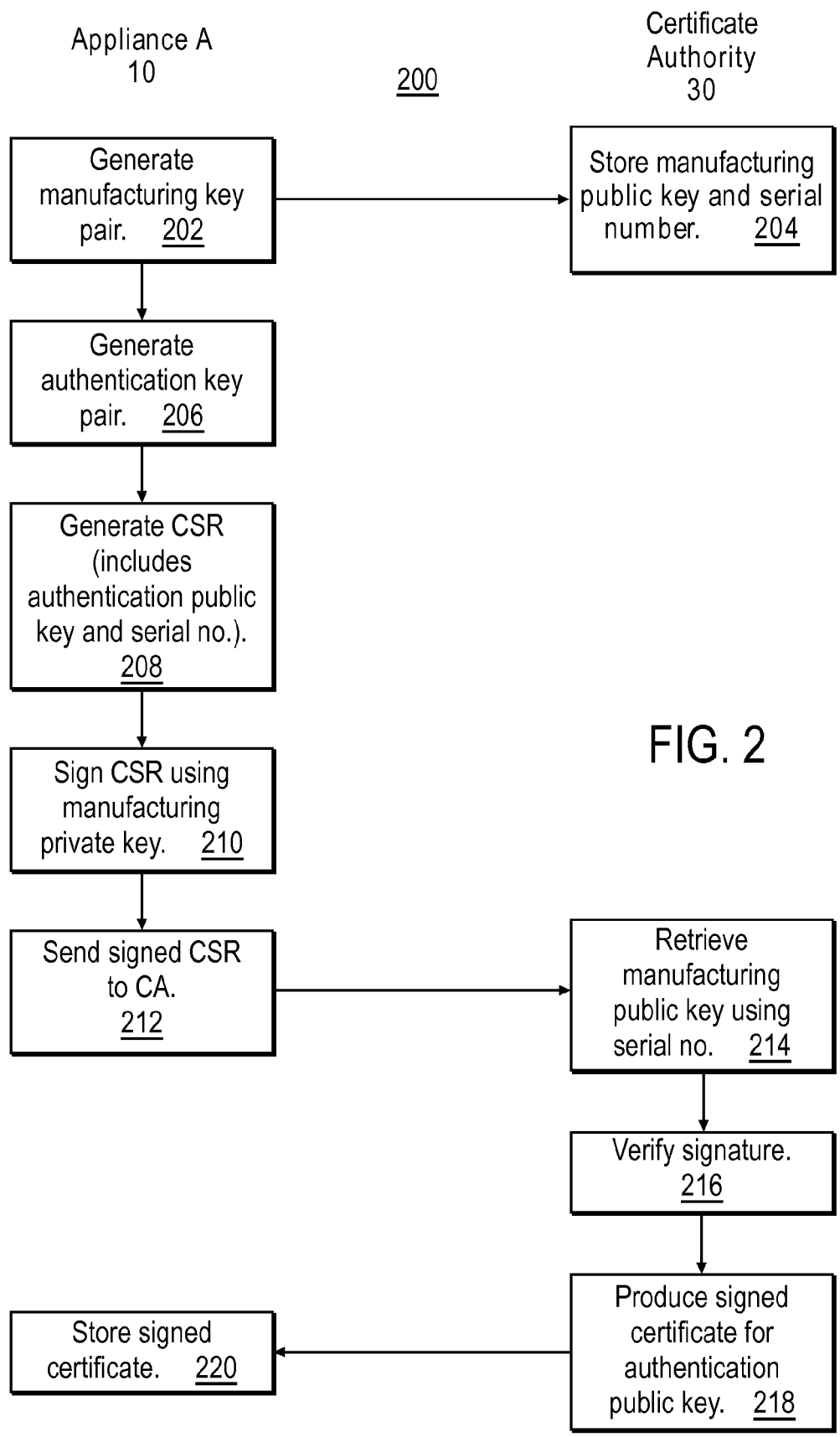
FIG. 2 is a flow chart depicting a method of generating a secure identity for a computer-based appliance according to one embodiment of the present invention.

With the above background, we turn now to FIG. 2. Illustrated therein is a process 200 for an appliance to obtain a signed certificate from a certificate authority, according to one embodiment of the invention. Although this example shows Appliance A 10 obtaining such a certificate from CA 30, the same procedures may be used by any other appliance to obtain a certificate from a CA. At the outset (202), during manufacture of Appliance A, a key pair is generated. This will be referred to as a manufacturing key pair and it consists of a manufacturing public key for Appliance A and a manufacturing private key for Appliance A.

The manufacturing key pair may be constructed by the subject appliance in the conventional fashion using prime factors installed in the appliance during the manufacturing process. This may occur prior to the appliance being shipped from the manufacturer and the manufacturing public key along with a unique identifier for the appliance (e.g., its serial number) may be provided to the CA before the appliance is deployed in a network (204). In such cases the manufacturer itself may act as or operate a CA.

In other embodiments, the operator of the appliance may prefer to use a CA other than that operated by the appliance manufacturer. In such cases, the operator may choose any unique (or, potentially, even a non-unique) identifier (a device ID) for the subject appliance and generate a key pair. This key pair may be generated by the appliance or it may be generated by other means, so long as the private key of this key pair is stored on the appliance for later use. A certificate that associates the key pair with the selected device ID can then be generated and provided (securely) to the selected CA for signing. The signed certificate may then be returned to the subject appliance and used as described below in place of the manufacturing key pair.

Regardless of which of the above-described procedures is used (and here it will be assumed that the manufacturing key pair and appliance serial number are used), the CA associates the manufacturing public key (or other public key, if used) with the appliance's unique identifier (e.g., in an appropriate database) so that the appliance may be identified at a later time. For example, the CA may store the manufacturing public key in a table that can be indexed using the appliance's serial number (or other device ID, if used). This will permit later lookup and retrieval of the manufacturing public key for use in verifying a digitally signed certificate request received from the appliance, as discussed below.

At some time after the CA has been provided with the unique identifier and manufacturing public key (or alternative (s) thereof) of the appliance, Appliance A generates a second key pair (206), called the authentication key pair, which consists of an authentication public key and a corresponding authentication private key. The authentication key pair is a key pair that the subject appliance intends to use during later authentication exchanges with peer appliances (including administrator nodes) within a network. The authentication public key along with the appliance's unique identifier are combined in a certificate signing request (CSR) (208) and this CSR is signed using the appliance's manufacturing private key (210) and sent to the CA (212).

Upon receipt of the CSR, the CA uses the appliance's unique identifier to retrieve the manufacturing public key (214). Using the manufacturing public key, the CA verifies the signature on the CSR (216). If the signature is valid (i.e., if the encrypted hash or digest of the CSR can be decrypted using the manufacturing public key corresponding to the appliance's serial number and matched against the hash or digest of the CSR computed by the CA), the CA can be certain that the CSR really is from the Appliance A (i.e., the appliance that it purports to be based on the serial number included in the CSR). In such cases, the CA will generate a digital certificate for the authentication public key of the appliance, sign the certificate using its own private key and return the signed certificate to the appliance (218). The appliance can then store the signed certificate for later use (220).

Variations of the forgoing procedure can be implemented. For example, instead of generating a new certificate, the CA may simply return a previously generated certificate that is still valid. Also, in some embodiments of the invention the CA could embed information regarding permissions to be granted to the requesting appliance within the signed certificate. That is, in addition to being used as an authentication token (discussed further below), the certificate could also be used as an authorization token, for identifying which services an associated appliance is authorized to use. Likewise, the CA could issue certificates coded to reflect different capabilities of appliances.

Figure 3:
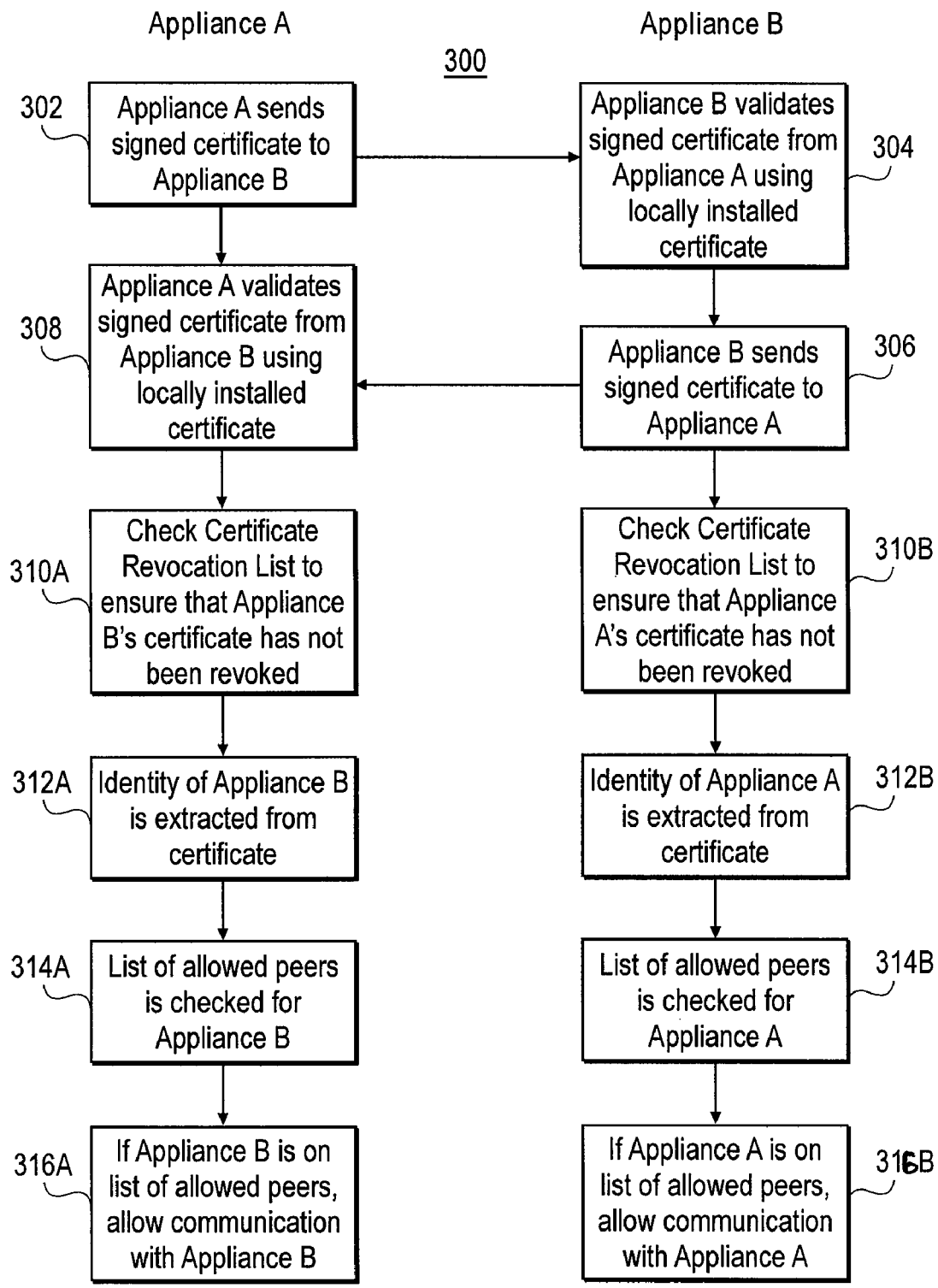
FIG. 3 is a flow chart depicting a method of mutual authentication among computer-based appliances communicatively coupled to one another according to one embodiment of the present invention.

Signed certificates such as those described above may be used in various appliance-to-appliance authentication processes in accordance with embodiments of the present invention. As part of such processes, Appliance A and Appliance B may mutually authenticate one another by exchanging encrypted challenges, which challenges each respective appliance must decrypt in order to be authenticated. For example, Appliance A can use the signed certificate received from the CA and its corresponding private key to authenticate itself to Appliance B using any secure communications protocol that uses certificates for authentication. One example of such a procedure is illustrated in FIG. 3 as process 300. Note that although the mutual authentication procedure is shown as a parallel process, the procedure could operate in serial fashion with one appliance completely authenticating the other before submitting its credentials for mutual authentication. In such a case, if the first authentication process were to fail, the second appliance likely would not submit its signed certificates to the first appliance for verification.

In this example, Appliance A sends the signed certificate it obtained from the CA (e.g., using the process depicted in FIG. 2) to Appliance B (302) for verification. To do so, Appliance B uses a locally installed CA certificate to validate the signed certificate received from Appliance A (304). While Appliance B is validating the signed certificate from Appliance A, Appliance B sends its own signed certificate to Appliance A for mutual authentication (306). Appliance A likewise validates the certificate from Appliance B using a locally installed CA certificate (308).

Once the certificates have been exchanged, the authentication processes at each appliance are similar. For example, each respective appliance will perform a revocation check on the certificate it received from the other appliance. Revoked certificates are not acceptable for authentication purposes.

In the illustrated example, at step 310 each respective appliance consults a certificate revocation list (CRL) to ensure that the certificate received from the other appliance has not been revoked. The CRL lists certificates that are no longer acceptable for authentication purposes. The list may be maintained by a network administrator or another individual with rights granted by the network administrator to modify the list.

In one embodiment of the invention, the CRLs are stored locally at each appliance (e.g., having been obtained when the CA issued a signed certificate for the appliance) and may be periodically updated (e.g., by distributions from the CA or other trusted source). Alternatively, the CRL may be stored remotely (e.g., at the CA) and requested by the appliance at the time it needs to perform the check. Or, the subject appliance may issue a request to the CA (or other repository where the CRL is maintained) for a determination of whether the certificate received from the other appliance has or has not been revoked. Alternatively, the on-line certificate status protocol (OCSP), which is described in RFC 2560, may be used to perform this check.

Assuming the certificate received from the appliance being authenticated has not been revoked, the identity of that appliance (e.g., its serial number) is extracted from the certificate (312) and compared against a list of allowed peers (314). An allowed peer may be an appliance that is active on the network at the time the authentication procedure is taking place. Alternatively, an allowed peer may be any appliance that is authorized to be part of the network, regardless of whether or not it is presently active on same.

This list of allowed peers may be stored locally at the appliance which is performing the authentication and periodically updated (e.g., by a network administrator or by a broadcast from an administration node, etc.), or it may be obtained from another trusted source owned or designated by the network administrator when required as part of an authentication procedure. Alternatively, the subject appliance may provide the extracted identity information to the administration node (or other trusted source) for a determination of whether or not the appliance identified thereby is an allowed peer of the submitting appliance. If the appliance is on the list of allowed peers, the appliance is authenticated and authorized to communicate with the subject appliance at which the authentication process is being performed (316).

In some cases, the certificate presented by one or both of the appliances may have been signed not by the CA, but by another appliance, which would in turn have a certificate signed by the CA. These may be regarded as proxy certificates. In such instances the above-described procedure would be modified to provide for checking not only the transmitting appliance's certificate for validity, but also the certificate from the appliance that signed it, and then looking up the identity of the appliance that signed the certificate to see if it also is an allowed peer.

Following authentication, if the appliance certificates include embedded permissions, the authenticating appliance may read those permissions from the certificate and grant permissions to the authenticated appliance accordingly. This may involve updating one or more databases at the authenticating appliance to ensure that limitations on the permissions are observed. Alternatively, permissions may be stored in a local table at the management node and retrieved using the appliance's unique identifier as an index into that table.

In one embodiment, the present invention may be used to authorize information transfers between authorized appliances. Once the above-described mutual authentication process has occurred, the appliances may exchange sensitive information between one another, having been assured that each appliance is the appliance it purports to be. Other information, such as software updates, could also be exchanged in this fashion. Any such information transfer may be one-way or two-way.

Figure 4:
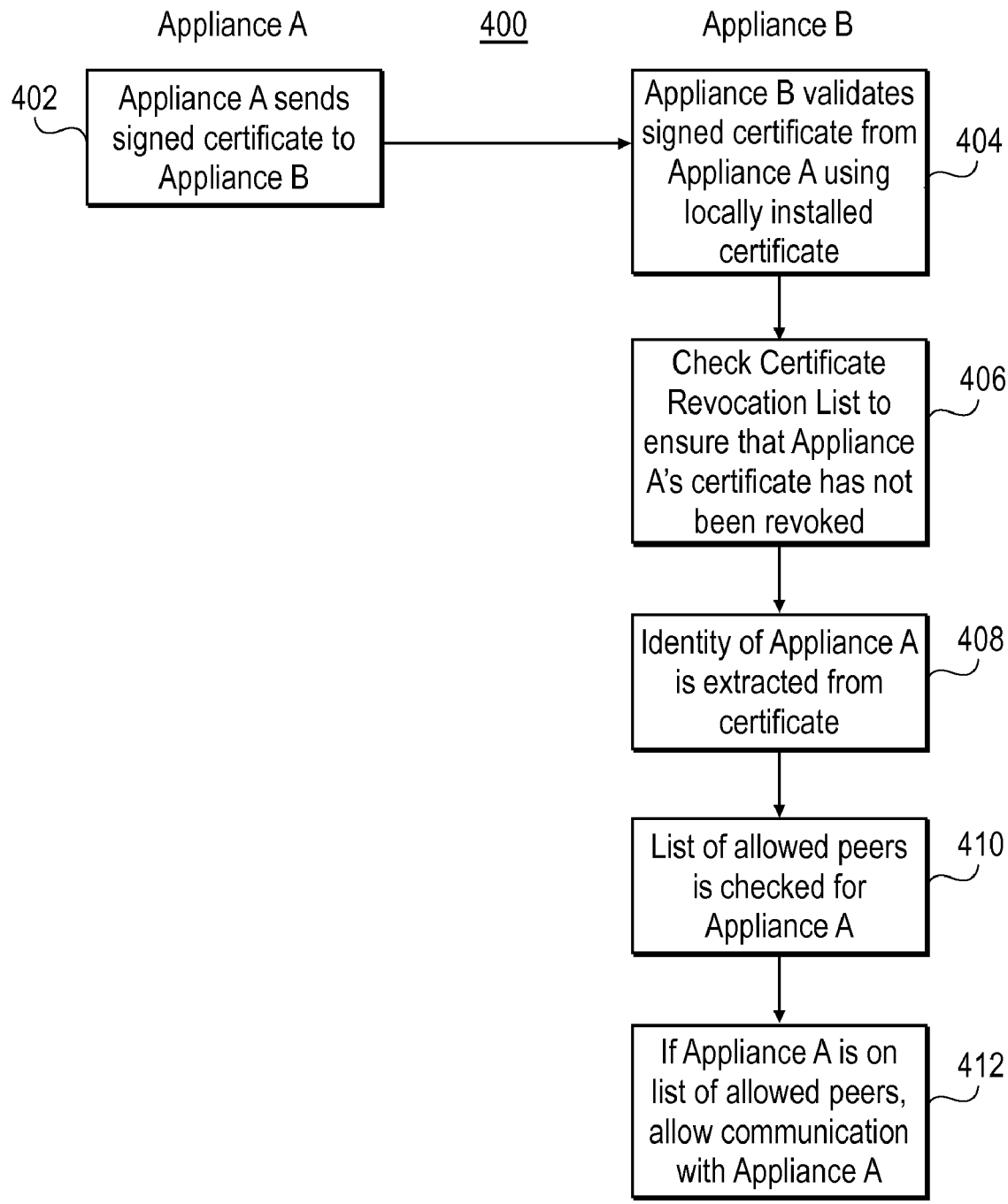
FIG. 4 is a flow chart depicting a method of one-way authentication between computer-based appliances according to a further embodiment of the present invention.

Other embodiments of the present invention provide a one-way authentication process 400, depicted in FIG. 4. In this example, Appliance A sends a signed certificate that it previously obtained from a CA to Appliance B for authentication (402). Appliance B validates the signed certificate using a locally installed CA certificate (404) and then checks a certificate revocation list to ensure that the certificate provided by Appliance A has not been revoked (406). Assuming the certificate has not been revoked, the identity of Appliance A is extracted from the certificate (408) and the list of allowed peers is checked to ensure that Appliance A is one of such peers (410). If Appliance A is on the list of allowed peers, Appliance A is authenticated and communication is permitted between Appliance A and Appliance B (412). In the one-way authentication method depicted in FIG. 4, Appliance B is never authenticated.

As with the mutual authentication process, the one-way authentication process may be used to authenticate either of a pair of computer systems for a subsequent information exchange there between. For example, either the source or the destination of a subsequent software download can be authenticated in this fashion. Or, the source or destination of a subsequent exchange involving information regarding one of the computer systems can be authenticated.

Figure 5A:
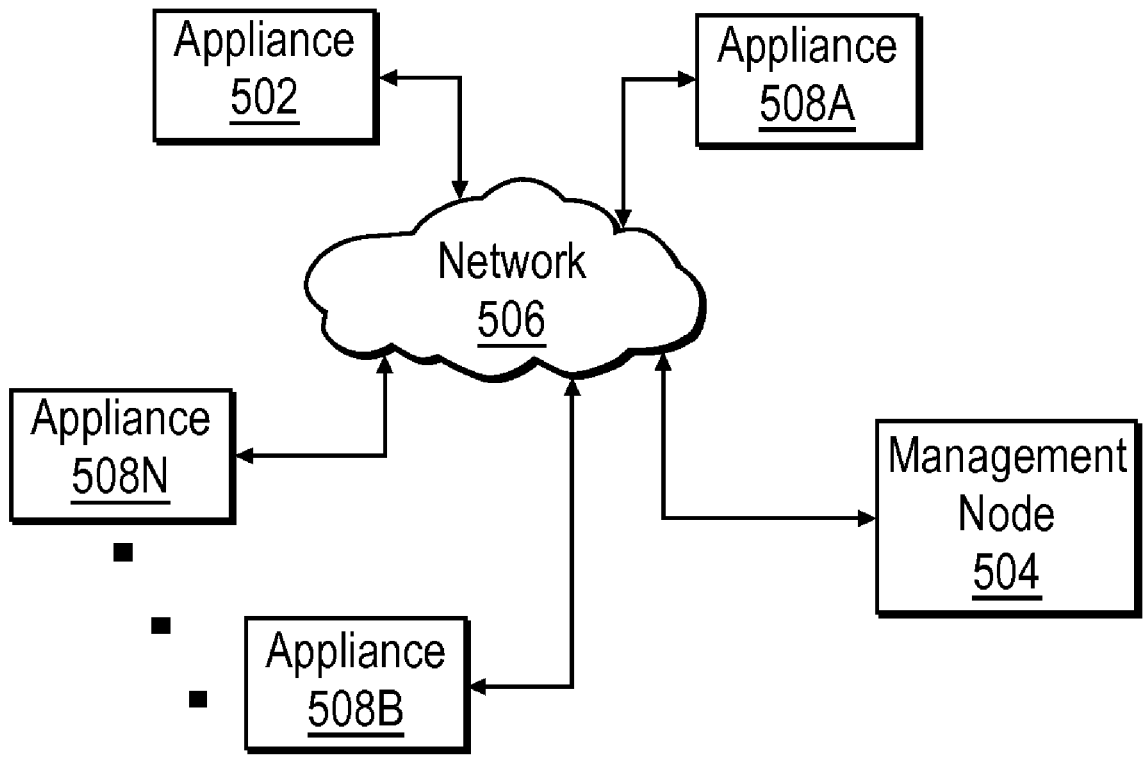
FIGS. 5A and 5B illustrate an example of the use of authentication techniques in accordance with an embodiment of the present invention.

An example to illustrate the use of the present invention is now discussed with reference to FIGS. 5A and 5B. In FIG. 5A, an appliance 502 is seeking to join a network 506 that includes a management node and existing authorized appliances 508A-508N. Assume for purposes of this discussion that appliance 502 has previously obtained a digital certificate that associates its serial number with an authorization key pair, as discussed above with reference to FIG. 2. Now, the appliance 502 seeks to join the network so that it can communicate with other authorized appliances thereof.

Figure 5B:
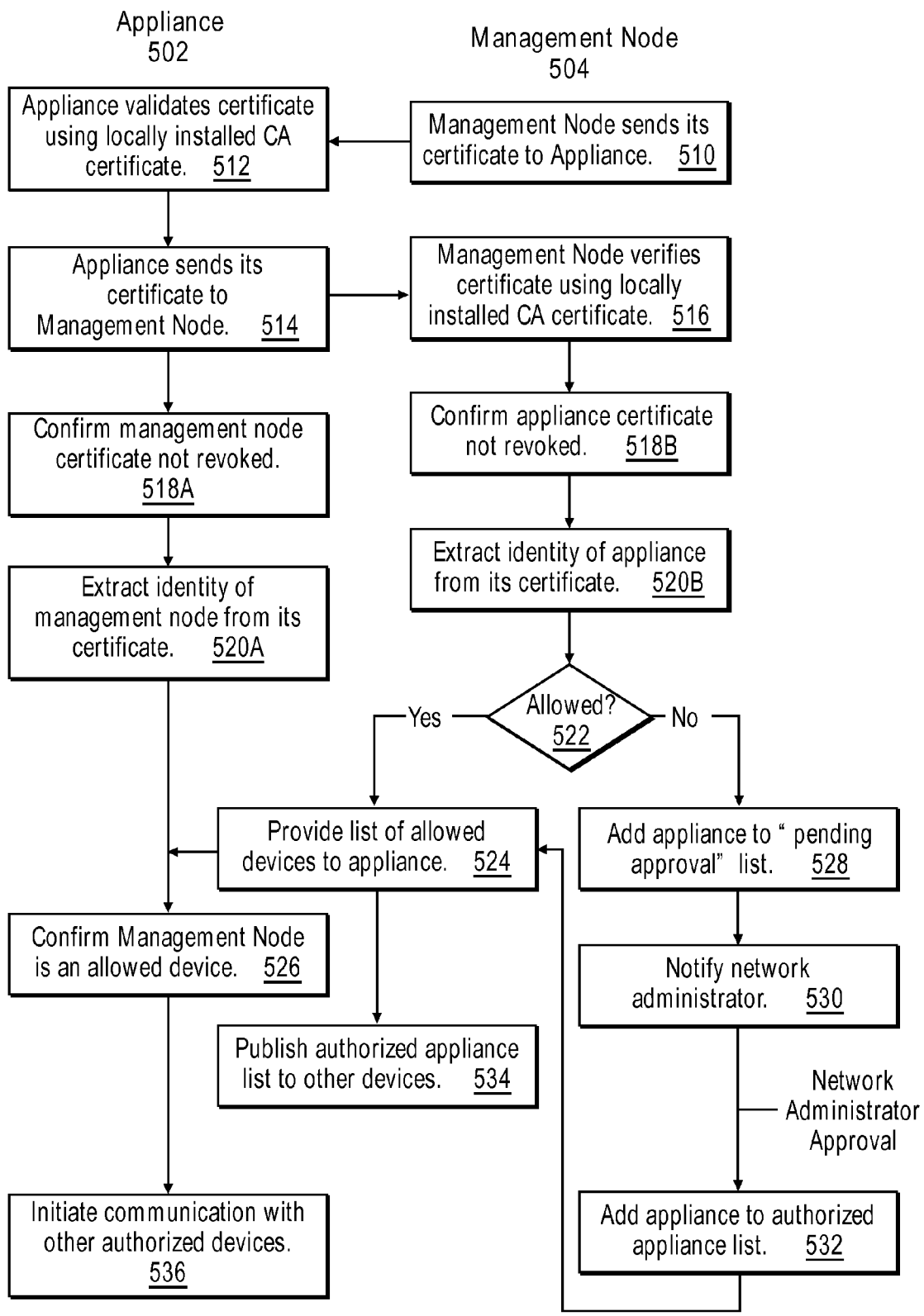

As shown in FIG. 5B, when appliance 502 is recognized, management node 504 sends its certificate to the appliance (510). The appliance 502 validates the management node's certificate using a locally installed CA certificate (512). While the appliance 502 is validating the certificate from management node, the appliance sends its own certificate to the management node for mutual authentication (514). The management node likewise validates the certificate from the appliance using a locally installed CA certificate (516). As discussed above, the management node and the appliance may each then proceed to confirm that the other's certificate has not been revoked (518). Any of the above-described procedures for this purpose may be employed. Assuming that each certificate remains valid, the identity of the corresponding device (e.g., its serial number) is extracted from the respective certificate (520).

Now, at the management node 504, the identity of appliance 502 is compared against a list of allowed devices for network 506 to determine if the appliance 502 is authorized to join the network (522). This list may be configured by a network administrator. If appliance 502 is listed as an allowed appliance for the network, further communication with appliance 502 is allowed and the list of allowed devices is provided to appliance 502 (524). Upon receipt of that list, appliance 502 confirms that the management node is an allowed device (526).

If, however, the appliance is not on the authorized list (522), the management node adds appliance 502 to a list of devices pending approval from the network administrator (528) and the network administrator is notified of the waiting requests (530). If the administrator rejects the request (not shown), appliance 502 is denied further access to the network. On the other hand, if the network administrator approves the request to join the network, the management node adds appliance 502 to a list of authorized appliances (532) and publishes the list to all authorized appliances (including appliance 502) within the network (524, 534). Thereafter, appliance 502 may communicate with other authorized devices (536).

Thus, systems and methods for authentication of computer-based appliances communicatively coupled to one another, for example via a network, have been described. The above-described processes may be completely automated and run with no input from a user. If no errors are encountered (e.g., while obtaining a signed certificate from a CA or authenticating another appliance), these processes may run without providing any notification at all to a user. The present invention may find application in a variety of situations. For example, mutual authentication of the type discussed herein may be useful when proxy pairs of a split proxy need to establish a secure tunnel between the devices. The two proxies may authenticate one another using the techniques proposed herein prior to establishing such a tunnel. Of course, this is merely an example of the usefulness of the present invention and neither this instance nor the examples presented above should be read as limiting the scope of the present invention.

What is claimed is:

1. A method, comprising:
storing, on a computer-based first appliance, a manufacturing key pair including a manufacturing private key;
obtaining, by the computer-based first appliance using the manufacturing key pair, a digital certificate associating an authentication key pair for the first appliance with a unique identifier for the first appliance, wherein the manufacturing key pair is different from the authentication key pair;
receiving, at a management node of a network, the digital certificate from the computer-based first appliance;
automatically authenticating, by the management node, the computer-based first appliance based on the digital certificate; and
authorizing, by the management node, the computer-based first appliance to join the network responsively to the authentication.

2. The method of claim 1, further comprising verifying the digital certificate has not been revoked prior to authorizing the first appliance to join the network.

3. The method of claim 2, wherein verifying the digital certificate has not been revoked comprises consulting a list of revoked certificates to make the determination.

4. The method of claim 3, wherein the list of revoked certificates is obtained from an issuer of the digital certificate.

5. The method of claim 1, wherein the unique identifier comprises a serial number.

6. The method of claim 1, further comprising granting permissions to the first appliance according to permission information included in the digital certificate.

7. The method of claim 1, further comprising verifying the first appliance is authorized to join the network prior to authorizing the first appliance to join the network.

8. The method of claim 7, wherein verifying the first appliance is authorized to join the network comprises consulting a list of authorized devices for the network, said list obtained from an administrator of the network.

9. The method of claim 1, further comprising submitting notifying a network administrator of a request by the first appliance to join the network after verifying the digital certificate but prior to authorizing the first appliance to join the network.

10. The method of claim 9, further comprising authorizing the first appliance to join the network after receiving approval from the network administrator.

11. The method of claim 1, further comprising updating a list of authorized devices for the network by adding the first appliance to the list.

12. The method of claim 11, further comprising distributing the list of authorized devices to authorized appliances of the network.

13. The method of claim 1, further comprising exchanging information with the first appliance following successful authentication thereof.

14. The method of claim 13, wherein the information comprises software.

15. The method of claim 1, further comprising presenting the first appliance with authentication information for a second appliance that is authenticating the first appliance.

16. The method of claim 15, wherein the authentication information for the second appliance comprises a second digital certificate.

17. The method of claim 15, wherein the first appliance is presented with the authentication information for the second appliance before the first appliance presents its digital certificate.

* * * * *